(12) United States Patent
Rego et al.

(10) Patent No.: US 9,366,541 B2
(45) Date of Patent: Jun. 14, 2016

(54) AMI VISUAL ROUTING

(71) Applicant: Florida Power & Light Company, Juno Beach, FL (US)

(72) Inventors: Adrian Jesus Rego, Miami, FL (US); Juan Morales, Miami, FL (US); Mark Mason, Pembroke Pines, FL (US); Alma R. Emerson, Palmetto Bay, FL (US); Amit Grover, Miami, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 212 days.

(21) Appl. No.: 13/731,640

(22) Filed: Dec. 31, 2012

(65) Prior Publication Data

US 2014/0188389 A1    Jul. 3, 2014

(51) Int. Cl.
    *G01C 21/34*     (2006.01)
    *G06Q 10/04*     (2012.01)
    *G06Q 50/06*     (2012.01)

(52) U.S. Cl.
    CPC .......... *G01C 21/343* (2013.01); *G01C 21/3453* (2013.01); *G06Q 10/047* (2013.01); *G06Q 50/06* (2013.01)

(58) Field of Classification Search
    CPC .. G01C 21/34; G01C 21/343; G01C 21/3453; G06Q 10/047; G06Q 50/06
    USPC ............................ 701/533; 700/89; 705/412; 340/870.02–870.11
    See application file for complete search history.

(56) References Cited

U.S. PATENT DOCUMENTS

| | | | |
|---|---|---|---|
| 7,109,882 B2 | 9/2006 | Angelis et al. | |
| 7,283,062 B2 | 10/2007 | Hoiness et al. | |
| 8,248,269 B1* | 8/2012 | Boyd et al. | 340/870.03 |
| 2011/0063126 A1* | 3/2011 | Kennedy et al. | 340/870.02 |
| 2012/0062389 A1* | 3/2012 | Solomon | 340/870.03 |
| 2012/0062390 A1* | 3/2012 | Solomon | 340/870.03 |
| 2012/0126994 A1* | 5/2012 | Sobotka et al. | 340/870.02 |
| 2013/0063280 A1* | 3/2013 | Pamulaparthy et al. | 340/870.09 |
| 2013/0187788 A1* | 7/2013 | Salter | 340/870.02 |

* cited by examiner

*Primary Examiner* — Muhammad Shafi
*Assistant Examiner* — Majdi Alsomiri
(74) *Attorney, Agent, or Firm* — Feldman Gale, P.A.

(57) ABSTRACT

The present invention includes a method for sequencing a meter route. The method may include a step for adding routes or premises to a map. This step may be implemented as a user initiated action with the operator creating a new route based on preexisting routes as a starting point. The premises or existing routes may correspond to a particular zip code. In one embodiment, every premise may be tied to a route.

20 Claims, 6 Drawing Sheets

AMI VISUAL ROUTING

FIELD OF THE INVENTION

Embodiments of the present invention generally relate to measurement of power consumption by an end user, and more particularly to a system and method for the visualization and generation of meter reading routing.

BACKGROUND OF THE INVENTION

Electricity generated at a power station may be produced using a plurality of energy sources, such as coal powered power station, nuclear fission, wind, or solar photovoltaic ("PV") cells, etc. This power generated at the power station is transmitted to users over a transmission grid. In recent years advancements have been made in transmission of power to an end user. One such advancement has been in the area of electrical power meters.

An electrical power meter may be implemented as an automatic meter reader (AMR) where the electricity usage is communicated one way to a meter reader. More recently, advanced metering infrastructure (AMI) meters have been developed. AMI meters differ from traditional AMRs in that they enable two-way communications between meters and an AMI command and control system. An AMI command and control system may receive data from the AMI meter and communicate it over a network to remote locations. Also, AMI command and control systems may send data to electric meters to perform various tasks.

Utility companies typically rely on meter reading to determine consumption of a utility by its customers. In conventional utility meter reading applications, operators need to come into close proximity to the conventional meter in order to complete a reading. Routes for conventional meters typically defined geographically and may include hundreds or thousands of meters. To determine the order in which meters in a route are read, utilities rely on sequential lists, which can be lengthy.

In areas where AMI meters that can be read remotely are deployed, the route design can be ineffective if a driver is forced to follow a route that includes many AMI meters. Thus, there is a need in the art for a method and system to generate routes by taking into account the presence of both AMI and conventional meters. There is a further need in the art for a tool to quickly determine new routes for meter readers as AMI meter deployment is underway.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with one embodiment, the present invention includes a method for sequencing a meter route. The method may include a step for adding routes or premises to a map. This step may be implemented as a user initiated action with the operator creating a new route based on preexisting routes as a starting point. For example, the premises or existing routes may correspond to a particular zip code. In one embodiment, every premise may be tied to a route.

The method may further include a step of assigning streets to premises, with this step returning one street name, with the street being assigned a traffic direction for routing purposes. This step may involve the association of two datasets: a list of points representing known addresses of premises and a set of lines corresponding to streets. The premises dataset may include textual information corresponding to the addresses of the premises. The street dataset may include textual information corresponding to a traffic direction. The method may further include a step of geometric or geospatial searching that assigns a point (premise) to a closest line (street).

To create a sequence in accordance with one embodiment, a first premise may be automatically selected by the system of the present invention as a first point or premise in the sequence. The method may further include a step of gathering or obtaining information about premises that are nearby to the previous premise or point in the sequence and identifying those as candidate premises.

The method may further include a geographically search to determine whether, in order of proximity, a candidate premise from step 207 exists on the same street and assigned direction as the previous premise in the sequence. If a candidate exists in the same street and direction as the last stop, then the candidate is added as a premise to the sequence. If none of the candidates exists in the same street and direction as the last stop, then the method selects a candidate as a premise according to the lowest travel cost. Once there are no additional premises to be added to a sequence, the method may optimize the formed sequence. The term "sequence" and "route" are used interchangeably in this document. Sequencing may be defined as the process for generating a route.

One object of the present invention is to provide a system and method to visually analyze the state of AMI meter deployment and performance in order to identify skipped premises needing an AMI, identify commercial/industrial meters not receiving an AMI meter, and distinguish between isolated meter issues or larger clusters indicating network problems, for example.

Another object of the invention is to provide a system and method for visually analyzing the state of AMI meter deployment and performance in order to decrease time spent creating clusters for optimizations that lead to quicker activations.

Another object of the invention is to provide a system and method for efficiently identifying and rerouting of non-AMI meters in order to achieve faster activations that lead to savings and customers receiving full AMI meter benefits (e.g., remote readings, AMI meter dashboard, etc.).

These features and advantages of the present invention will become more readily apparent from the attached drawings and description of illustrative embodiments, which follow.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION OF ILLUSTRATIVE EMBODIMENTS

The following detailed description of certain embodiments of the subject matter set forth herein, will be better understood when read in conjunction with the appended drawings. As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. In the description that follows, like numerals or reference designators will be used to refer to like parts or elements throughout.

With the deployment of Smart Meters (AMI meters) underway, there is a need to optimize meter routes for areas where smart meters have not yet been deployed. The system and method of the present invention allows users to visually see the AMI/smart meters as well as non-smart meter deployment on a map and create a new meter reading route. In accordance with an embodiment of the present invention, a user can easily mark an area in a map and quickly create new routes. In addition, users may group meters into clusters for deployment optimization.

In one embodiment, a suite of geospatial tools or modules may be used during smart meter deployment, optimization, and activation. These tools enable the realization of smart meter benefits and savings for utilities and their customers.

Figure 1:
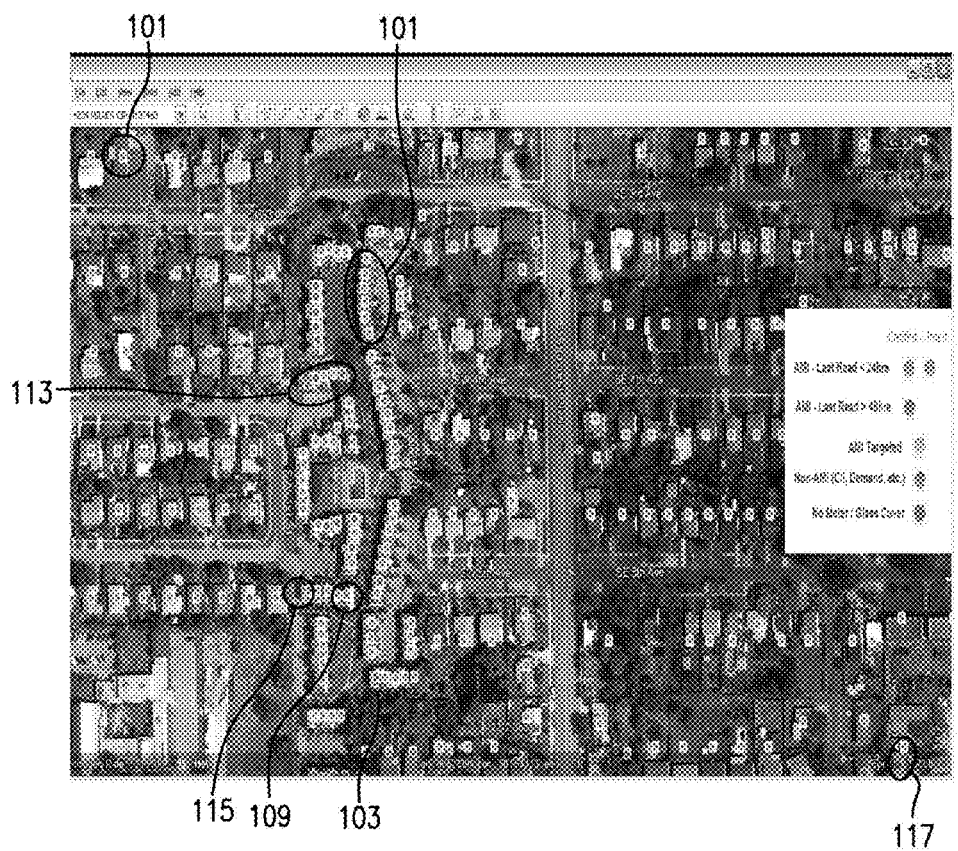
FIG. 1 illustrates a user interface for displaying meters overlaying a satellite image of a geographical area in accordance with an embodiment.

The map illustrated in FIG. 1 shows a satellite view of a geographical area with residential or commercial customers of a utility. In the illustrated embodiment, the customers are assigned a meter color that depends on the type of meter deployed on the customer's premises, on the type of reading, and other characteristics that are customizable. For example, in FIG. 1, the meters identified with numeral 101 are AMI meters that have a certified reading that was completed during the last twenty four hours and meters identified with numeral 103 are AMI meters that have a non-certified reading that was completed during the last twenty four hours. Meters that have a certified or non-certified reading that was completed more than twenty four hours ago may also be displayed. Once a meter passes a certain criteria, the meter is certified so that a manual or visual inspection reading is required.

Meters identified with numeral 109 are AMI meters that have a certified reading that was completed more than forty eight hours ago. Also, meters identified with numeral 113 are non-smart meters that have a scheduled AMI meter installation; meters identified with numeral 115 are non-AMI meters; and areas marked with numeral 117 refer to areas that have no meters. In one embodiment, the user interface provides a high-level view of meters and their current deployment (manual meter, AMI deployed, AMI targeted) and performance state (read state based on nightly register read from a meter management system that collects and aggregates all readings, including AMI and conventional).

Figure 2:
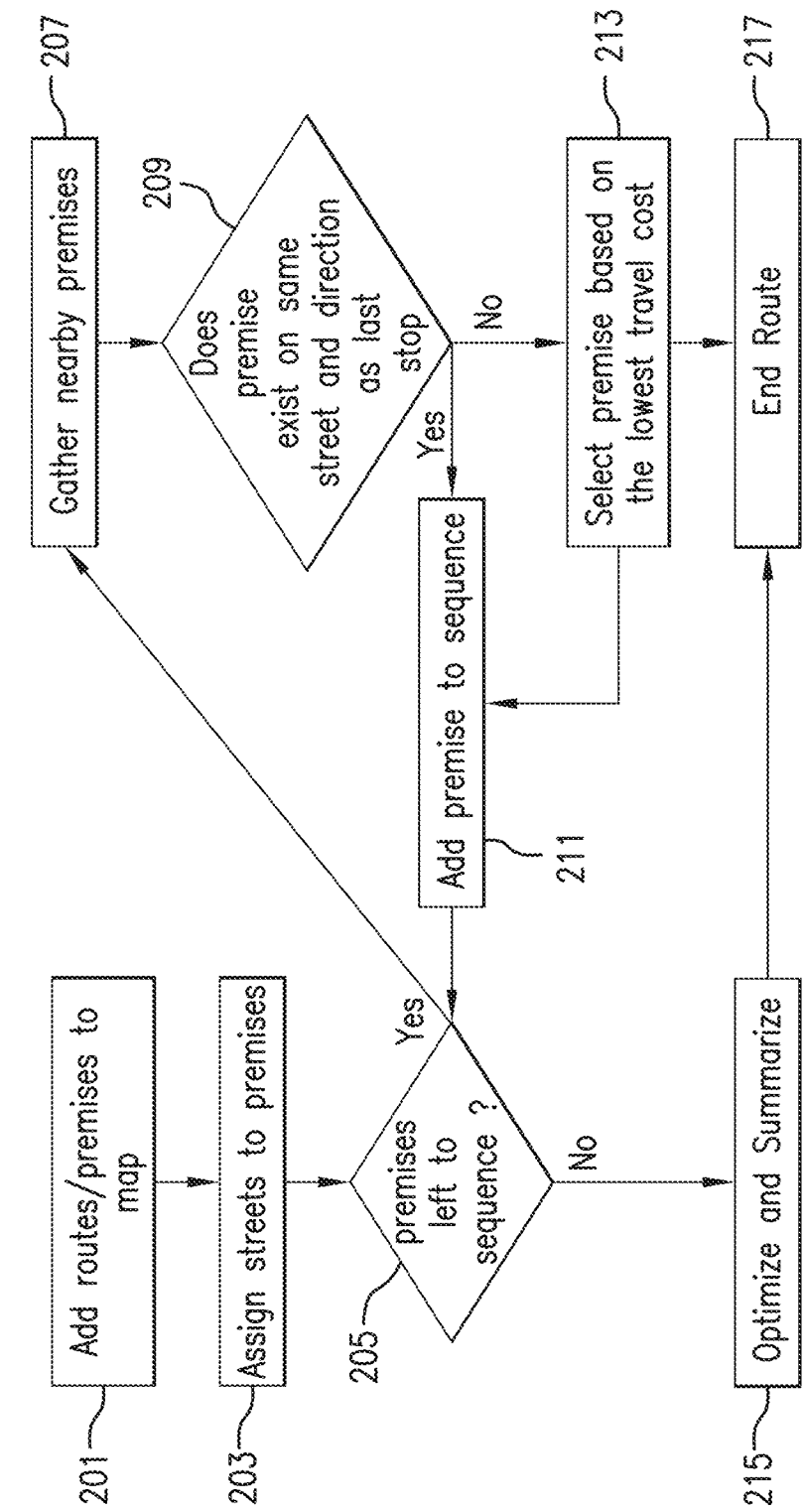
FIG. 2 illustrates a method for creating a meter route in accordance with an embodiment.

FIG. 2 illustrates a method for sequencing a route. Step 201 may include adding routes or premises to a map. This step may be implemented as a user initiated action with the operator creating a new route based on preexisting routes as a starting point. For example, the premises or existing routes may correspond to a particular zip code. In one embodiment, every premise is tied to a route. The method illustrated in FIG. 2 may be viewed as a method for combining new routes from the context of existing routes (e.g., breaks down premises to include in a sequence only certain premises).

Step 203 may include assigning streets to premises. The output of this module returns one street in accordance with one embodiment, with the street being assigned a traffic direction (whether street is a two way street) for routing purposes. This step may involve the association of two datasets: a list of points representing known addresses of premises and a set of lines corresponding to streets. The premises dataset may include textual information corresponding to the addresses of the premises. The street dataset may include textual information corresponding to a traffic direction. Step 203 may include a geometric or geospatial search that assigns a point (premise) to the closest line (street).

At step 205 the sequencing process begins. A first premise may be automatically selected by the system of the present invention as a first point or premise in the sequence. Step 207 may include gathering or obtaining information about premises that are nearby to the previous premise or point in the sequence. For example, step 207 may return a set of five most nearby premises with a 1/100 of a degree (latitude/longitude degree) radius to consider as the next premise in the sequence. One goal of this step is to minimize travel cost.

Step 209 may include a geographical search to determine whether, in order of proximity, a candidate premise from step 207 exists on the same street and assigned direction as the previous premise in the sequence. One advantage of this step is that it prevents unneeded turns in a sequence. If a candidate exists in the same street and direction as the last stop, then the candidate is added as a premise in step 211. If none of the candidates exists in the same street and direction as the last stop, then step 213 selects a candidate as a premise according to the lowest travel cost. In one embodiment, travel cost may be calculated using the edge-based, shortest-path Shooting-Star algorithm provided by the pgRouting package (http://pgrouting.org/). Routing may be performed on a street to street (edge-based) basis, as opposed to a premise to premise (node-based) basis. Thus, a "stop" may relate to a directional edge of a street ("SW 8th St. Heading East between 97th ave. and 92nd ave."). One advantage resulting from the implementation of step 213 is that it may avoid adding as a next stop in the sequence a premise that is separated by the last premise added to the sequence that is separated by a channel, for example.

Once there are no additional premises to be added to a sequence, step 215 may be implemented to optimize the formed sequence. In optimizing a route, which may be defined as a sequence of streets, the optimization step looks for areas that can be merged or broken. For example, if a particular street is several miles in length, the optimization step may break down the route to make it more efficient to navigate. Once step 215 is performed, the route is finalized in step 217.

Figure 3:
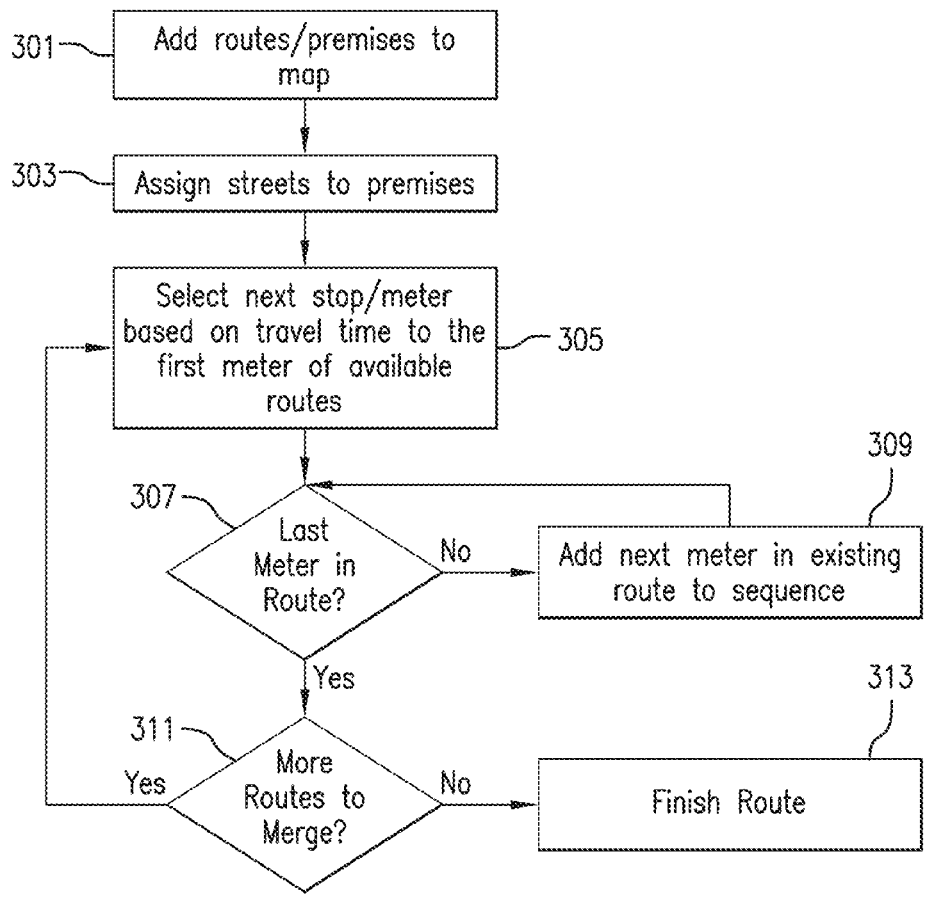
FIG. 3 illustrates a method for merging meter routes in accordance with an embodiment.

The "Optimize and Summarize" step 215 may split stops along long edges based on a constant. The constant may be a preset distance, for example stops more than one hundred meters apart from each other. Multiple stops may be needed along the same street if meters/premises are far enough away from each other. The summarizing may calculate the overall time it takes to complete a route by adding the following factors, for example:

Travel Time—uses travel cost from Shooting-Star algorithm
Time from office to first stop
Time from last stop back to the office
Time between each stop
Stop Time—stop_time*num_stops
Amount of constant time assigned to a stop. Accounts for starting/stopping car and walking up to meter
Read Time—read_time*num_meters
Read time may be defined as the time estimated for gathering and entering a meter read into a handheld reading device (this may vary by meter type).
Varies by meter type FIG. 3 illustrates a process for merging routes. Step 301 is similar to step 201 in that it may involve the addition of existing routs or premises to a map. Step 303 is also similar to step 203 in that it may involve assigning streets to premises.

Step 305 includes selecting a next stop or meter (a premise such as an apartment building can include several meters) based on travel time to the first meter of each available routes. Step 305 optimizes how one travels from the first meter of each route (pick first meter from a route as long as the travel time is the shortest from the point that operator is currently at. Step 305 may be implemented through use of the pgRouting algorithm.

At step 307 the method determines whether the last meter in the route has been selected. If not, a next meter in the existing route is added to the sequence in step 309 (the previous sequence is reused). If the last meter in the route has been added to the sequence, then at step 311 the method determines whether additional routes are to be merged, and if so, the pgRouting algorithm is applied again to calculate the time it would take to go through the merged routes. If no more routes are to be merged, then the route is finalized in step 313.

Figure 4:
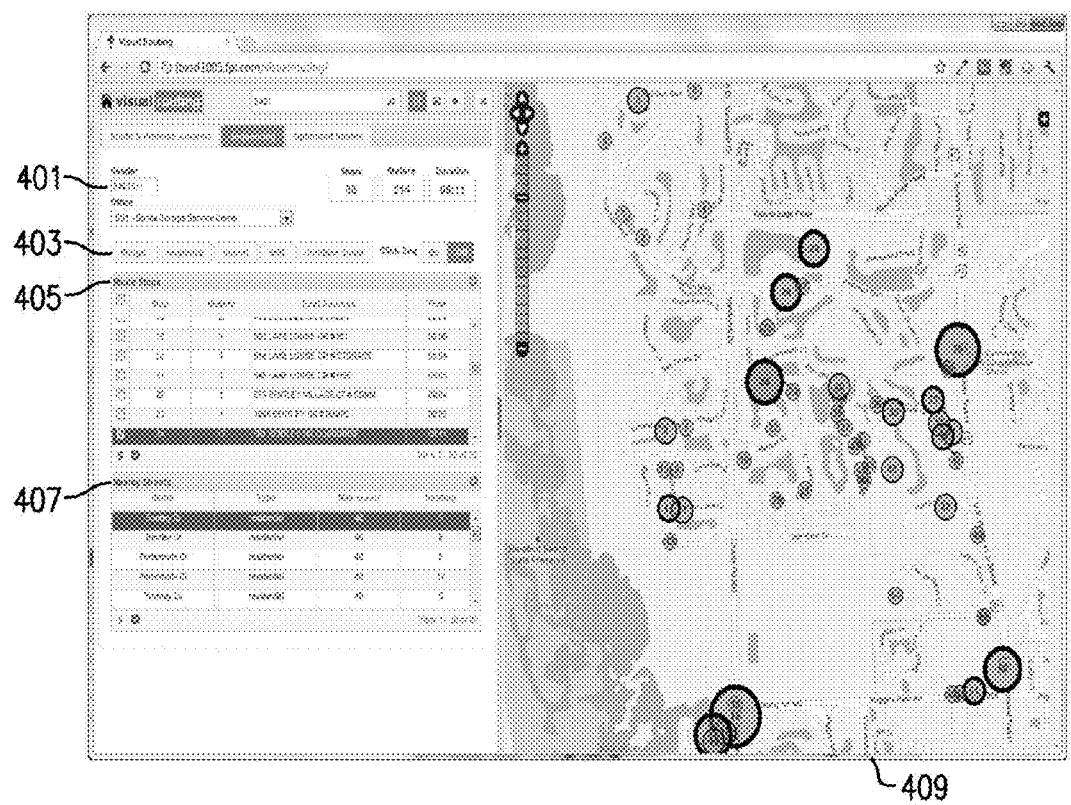
FIG. 4 illustrates a user interface for modifying meter routes in accordance with an embodiment.

FIG. 4 illustrates a Visual Routing user interface in accordance with one embodiment of the present invention which may be used to easily create new meter reading routes.

Numeral 401 in FIG. 4 represents an Overview window that may display route header information (e.g., a unique route ID); a starting location (e.g., Meter Reading Office) which may be entered manually into the system with other remaining locations in a route calculated automatically in accordance with one embodiment; number of stops, where a stop may be defined as a point in the route where the meter reader must exit vehicle (and a stop can be associated with multiple meters); number of meters in the route (AMI or other type); and duration. Duration may be defined as the sum of the following: i. travel_time (travel time from/to office plus travel time between stops), ii. stop_time (stop_constant multiplied by the number of stops), and iii. read time (number of meters multiplied by the meter read time. The stop_constant may be used to factor in the time it would take the meter reader to get out and walk to a facility, go through security, etc. The constant may be determined by calculating n average time it takes to walk to a meter get back to the car; with the constant being subsequently weighted based on actual time it takes to finish a route.

In one embodiment the meter read time may vary based on the meter type.

Numeral 403 in FIG. 4 represents an Action Bar that may be used by a user to customize routes. For example, users of the present invention may customize a route created using the method of FIG. 2. Users have available Merge option as part of the Action Bar. The Merge option may be used to merge existing meter routes into one. In one embodiment, the Merge Option preserves sequence of meters within each route, but uses shortest paths to travel between routes.

Users have available Sequence option as part of the Action Bar. In one embodiment, users may use this option to sequence all premises displayed on the map In FIG. 4 into one route based on shortest path algorithms.

The Import option in the Action Bar may allow users to import a sequenced list of premises. In one embodiment, application of the Import function preserves an input sequence. For example, the option may be used to add a list of meters or premises in the order that the system user wants to, does not necessarily to use the tool to create new sequence. The Import option may also be used to calculate estimated time, and also for merging routes. The route imported is an old or saved route in accordance with an embodiment.

The Split option in the Action Bar may be used to create a new route from stops selected by a user. This function may be used to remove the selected stops from the current route.

Additional options in the Action Bar may include a Combine Stops function which may allow the combination of selected stops into one, and a Click-Sequencing option, which may allow the system to manually override a suggested route by clicking on stops in a sequence.

Numeral 405 in FIG. 4 represents a Route Stops interactive application that may be used to delete stops through a stop selection and deletion manual process right on the map of FIG. 4. The Route Stops application may provide detailed information such as a list of stops in a sequence, including a number of meters, stop time (including travel time, stop constant, and read time), and address of first premise. The map interaction may be implemented through use of open layers. In one embodiment, deletion of stops does not alter the calculated route time because the changes are made on the map on the client's side (as opposed to a server's side). Once the changes are made, they are submitted (i.e., the sequence) to a server that calculates the route time.

Numeral 407 in FIG. 4 represents a Nearby Streets interactive application that may be used to override the selected street or direction used to arrive at a stop right on the map of FIG. 4. This function is similar to the Route Stops function in that once the streets or directions are overridden, the sequence is sent to a server for validation and calculation of route time. In one embodiment, the system displays an auto-refreshing list of streets near a currently selected stop.

Numeral 409 in FIG. 4 represents an interactive map that displays premise clusters and sequenced stops in accordance with one embodiment. For example, the size of a circle may correspond to the number of premises in a cluster or the number of meters in a stop. Numerals 1-55 in the map may be used indicate the number of premises in a cluster (size of the circle) or sequence of a stop. In one embodiment, multiple layers may be displayed (e.g., street view, satellite view, etc.). The map may be used to conduct multiple selection of premises and stops, and removal of premises and stops from a route. Also, the map may be used to move premises and update location data. In one embodiment, route changes made through use of the map may be validated by a server so that no single premise is covered by more than one route.

Figure 5:
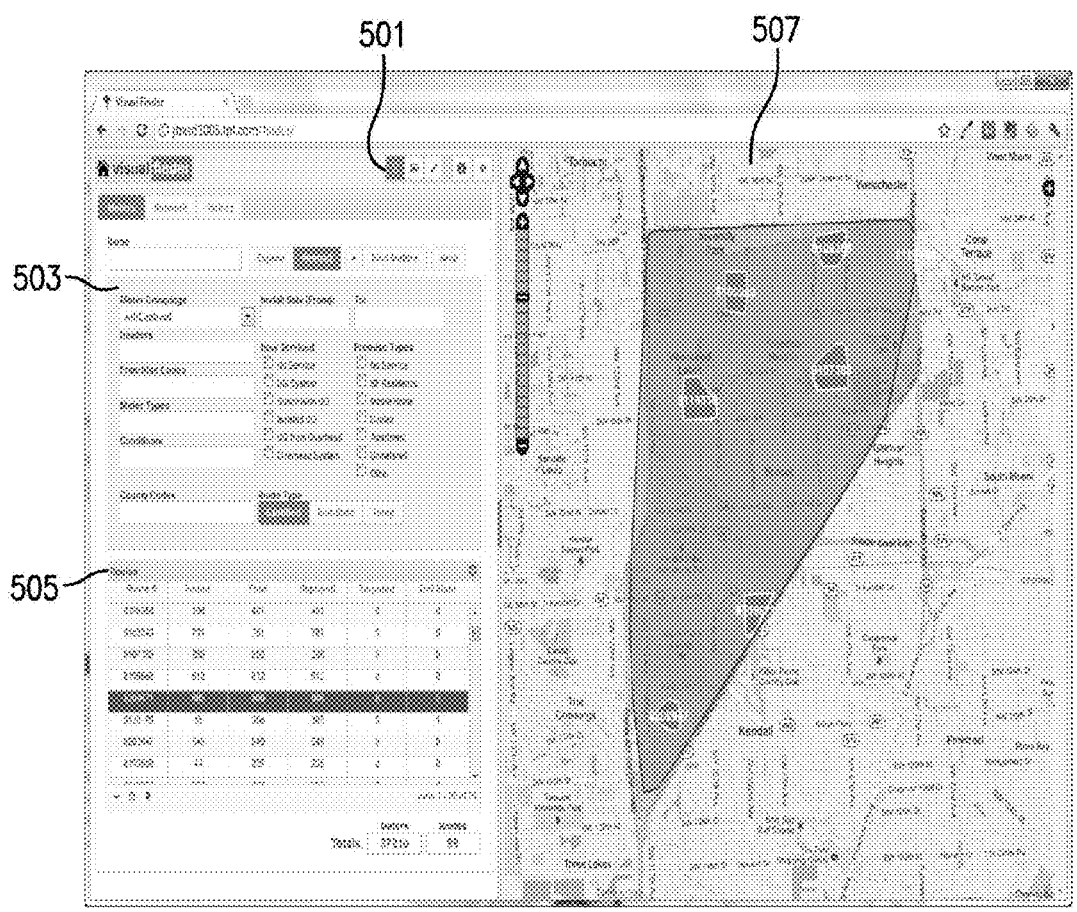
FIG. 5 illustrates a user interface for searching and displaying meter routes in accordance with an embodiment.
Figure 6:
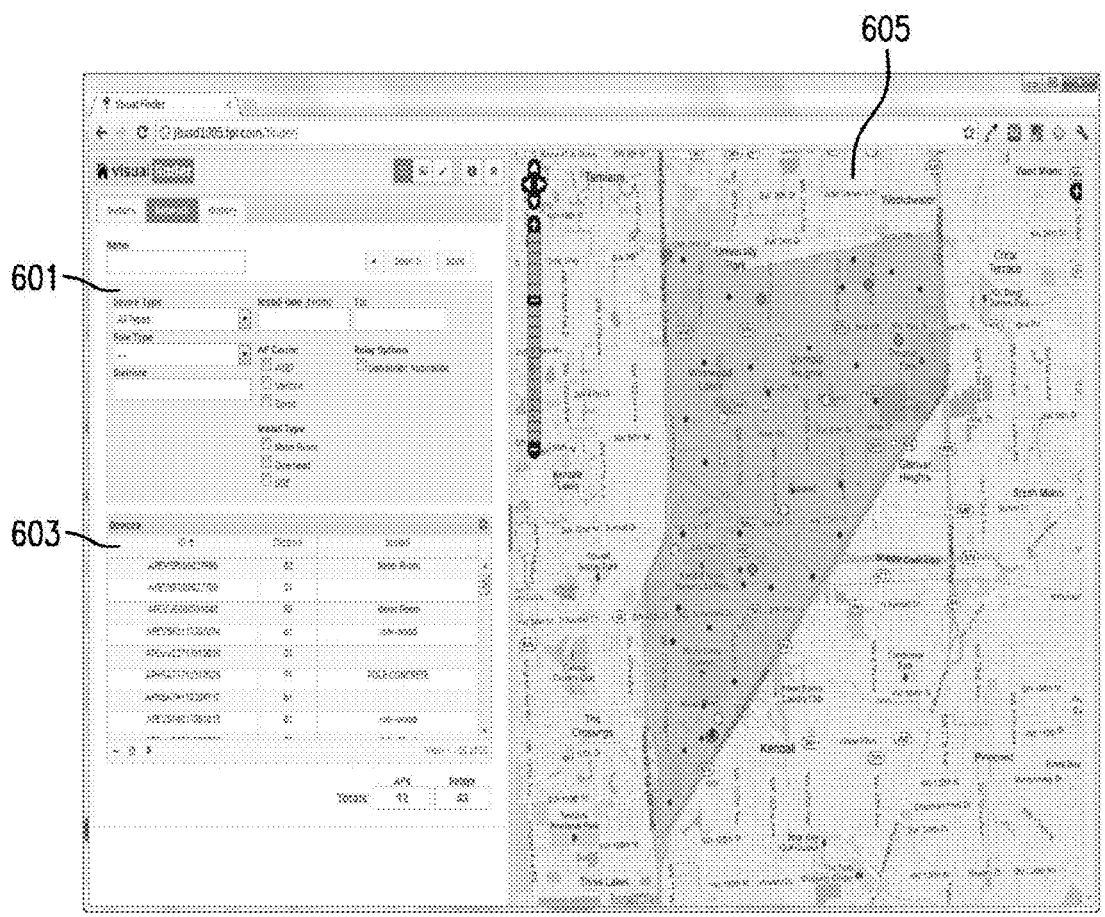
FIG. 6 illustrates a user interface for searching and displaying network devices in accordance with an embodiment.

FIGS. 5 and 6 illustrate embodiments of the Visual Finder user interface supported by the system of the present invention. The Visual Finder user interface allows users to query meters and AMI network assets. Queries can be created by filtering on traditional attributes (type, district, condition, etc.) or by drawing or selecting a geographic region.

FIG. 5 illustrates a graphical user interface that may be used to query meters. Numeral 501 in FIG. 5 represents a Map Controls option, which allows moving and drawing within map. The user may draw a box of any kind or shape and the system retrieves the number of meters within the box. The search can be done at the route level to assist with meter deployment. Restriction may be defined as a query that will only return meters found within the box, while expanding may be defined as a query that will look at routes that fall within the box drawn.

The embodiment illustrated in FIG. 5 may be considered an alternative to the embodiment illustrated in FIG. 2. Numeral 503 represents a query function which may be based on filtering attributes. In the illustrated embodiment, the option is set to query meters. The searchable attributes may include headers (which may include a code corresponding to a district defined by a utility, a cycle day code and route ID); franchise codes (e.g., tax franchise code at a municipality level); meter type (e.g., AMI, non-AMI, etc.); meter conditions (state that the meter is in, such as ON, OFF, disconnected, power cut off, etc.); county codes (used to identify a county); installation date range; how the meter is serviced or powered (no service, underground ("UG") system, subdivision UG, isolated UG, UG from overhead, overhead system); premise type (no service, Single Family residence, mobile home, duplex, apartment, unmetered, etc.); and route type (certified route of completely automated meters not requiring manual read, end-state route of manual meters, temporary routes consisting of automated meters that are currently being read manually). In one embodiment, a header is comprised of a 2 digit district code, 2 digit cycle day code (day that route is scheduled for billing in 21 day cycles, for example), and a 3 digit route ID. One can have multiple routes with the same route ID number but they would have to be in different districts and different cycle days.

Once the find meters button is activated, the user interface displays the query results 405, which in the illustrated embodiment are displayed at the route level. For example, the user interface may display a breakdown of meters in a route and how many meters were returned as in response to the query. Clicking on individual routes (e.g., route 8209671) toggles the extent of the route on the map.

Numeral 507 represents a map which is a main canvas for drawing a query region and visually displaying meter route results. Thus, meters can be searched based on attributes or by drawing a query region. In the illustrated embodiment, the grey area boundary represents the extent (convex-hull) of all query results in accordance with one embodiment.

FIG. 6 illustrates a user interface that enables a query of network devices (e.g., Access Points or relays) in accordance with one embodiment. For example, the user interface may include a search window 601 that enables the search of the network devices based on the type of device, a pole type (for example, where the Access Point is installed), the district in which the device is installed, the Access Point carrier, relay options (relays may be equipped with sensors that provide additional information or act in a certain automated manner), and the type of installation (meter room, overhead, underground enclosure, etc.).

Numeral 603 represents the results of the search. In the illustrated embodiment the search results are displayed based on the network device ID, the district and the installation type. The results may also show the number of Access Points and Relays.

Numeral 605 represents a map which is a main canvas for drawing a query region and visually displaying network device results. Thus, network devices can be searched based on attributes or by drawing a query region, which is not necessarily a uniform region. In the illustrated embodiment, the grey area boundary represents the extent of all query results in accordance with one embodiment. In the illustrated embodiment, the larger circles in the map represent Access Points while the smaller circles represent relays.

The various embodiments and/or components, for example, the modules, elements, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions, types of materials and coatings described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A computer-implemented method for sequencing a meter reading route, the computer comprising a reading device, the method comprising:
   adding a sequence of premises to a map;
   setting a premise from said sequence of premises as a starting point for a new route;
   assigning streets to premises in the sequence of premises;
   determining whether there are any premises to add to the new route, and,
      when there are premises to be added to the new route,
         obtaining information about candidate premises that are nearby to a premise previously added to the new route,
         adding a nearby candidate premise to the new route when that nearby candidate premise exists on the same street and assigned direction as the previous premise in the new route or when that nearby candidate premise represents the lowest travel cost from the previous premise;
         validating said new meter reading route when no single premise in said new route is also covered by another meter reading route; and
         displaying said new meter reading route through a user interface on the reading device.

2. The method of claim 1, further comprising:
   optimizing the new route after a last premise is added to the new route.

3. The method of claim 2, wherein optimizing comprises searching for stops in the new route that can be split or merged.

4. The method of claim 3, further comprising splitting a stop based on a preset distance.

5. The method of claim 2, wherein optimizing comprises breaking down the new route to make it more efficient to navigate.

6. The method of claim 1, wherein the step of obtaining information about candidate premises that are nearby to a premise previously added to the new route comprises a geographical search to list candidate premises in order of proximity to the previous premise.

7. The method of claim 1, wherein the step of obtaining information about candidate premises that are nearby to a premise previously added to the new route comprises a geographical search for candidate premises that are located approximately within a $\frac{1}{100}$ degree radius of the previous premise.

8. The method of claim 1, wherein assigning streets to premises comprises assigning a traffic direction to the streets for routing purposes.

9. The method of claim 1, wherein assigning streets to premises comprises associating a premises dataset and an address dataset.

10. The method of claim 9, wherein the premises dataset comprises textual information corresponding to the addresses of the premises.

11. The method of claim 9, wherein the street dataset includes textual information corresponding to a traffic direction.

12. The method of claim 1, wherein assigning streets to premises comprises associating a list of points representing known addresses of premises and a set of lines corresponding to streets.

13. The method of claim 1, wherein assigning streets to premises comprises conducting a geometrical or geospatial search to assign a point representing a premise to a closest line representing a street.

14. The method of claim 1, wherein said starting point corresponds to a preexisting route.

15. The method of claim 1, wherein said starting point corresponds to a zip code.

16. The method of claim 1, wherein the new route includes premises with meters that are not read remotely.

17. The method of claim 1, further comprising calculating the overall estimated time to complete the new route.

18. The method of claim 17, wherein said calculating is based on at least one of the following factors:
   travel cost;
   travel time from office to first stop in the new route;
   travel time from last stop in the new route and back to the office;
   travel time between each stop in the new route;
   amount of constant time assigned to a stop; and
   meter read time.

19. The method of claim 17, further comprising displaying the new route and the estimated time for completion of the new route.

20. The method of claim 1, further comprising displaying the new route.

* * * * *